United States Patent [19]

Richardson

[11] Patent Number: 4,829,704
[45] Date of Patent: May 16, 1989

[54] ANIMAL TRAP

[76] Inventor: Josephine M. Richardson, Rte. 5, Decatur, Ind. 46733

[21] Appl. No.: 138,071

[22] Filed: Dec. 28, 1987

[51] Int. Cl.⁴ .............................................. A01K 69/08
[52] U.S. Cl. ............................................................ 43/66
[58] Field of Search ........................................ 43/65, 66

[56] References Cited

U.S. PATENT DOCUMENTS

| | | |
|---|---|---|
| 686,800 | 11/1901 | Barry . |
| 764,085 | 6/1904 | Walton ..................................... 43/66 |
| 1,029,053 | 6/1912 | Evans . |
| 1,077,098 | 10/1913 | Sebesta . |
| 1,222,191 | 4/1917 | Dodson . |
| 1,393,438 | 10/1921 | Greim . |
| 1,472,210 | 10/1923 | Fall . |
| 1,479,889 | 1/1924 | Brown . |
| 1,506,045 | 8/1924 | Boyer ..................................... 43/65 |
| 1,562,397 | 11/1925 | Welchel . |
| 1,846,851 | 2/1932 | Dodge . |
| 2,162,623 | 6/1939 | Livingston . |
| 2,316,888 | 4/1943 | Schreyer ................................. 43/66 |
| 2,578,172 | 12/1951 | Burton ..................................... 43/65 |
| 2,897,627 | 8/1959 | Neid ......................................... 43/65 |
| 3,393,468 | 7/1968 | Wood ....................................... 43/66 |
| 3,821,861 | 7/1974 | Jalbert ..................................... 43/65 |
| 3,906,654 | 9/1975 | Leslie ...................................... 43/65 |
| 4,184,283 | 1/1980 | Wyman ................................... 43/65 |

FOREIGN PATENT DOCUMENTS

| | | | |
|---|---|---|---|
| 1065609 | 11/1979 | Canada .................................. 43/67 |
| 969806 | 5/1950 | France . |

Primary Examiner—M. Jordan
Attorney, Agent, or Firm—Arlyce R. Stearns

[57] ABSTRACT

An apparatus for trapping animals of similar dimension. A generally wire mesh cage having a finer wire mesh tunnel and baffle permits animals to enter the cage but prevents animals from escaping from the cage. A solid floor and a solid rim around the bottom perimeter of the cage prevents both loss of food and pollution of the environment from the droppings of the animals. A door can be secured both in a closed position and in an open position to facilitate servicing the cage when it becomes too crowded with animals.

10 Claims, 1 Drawing Sheet

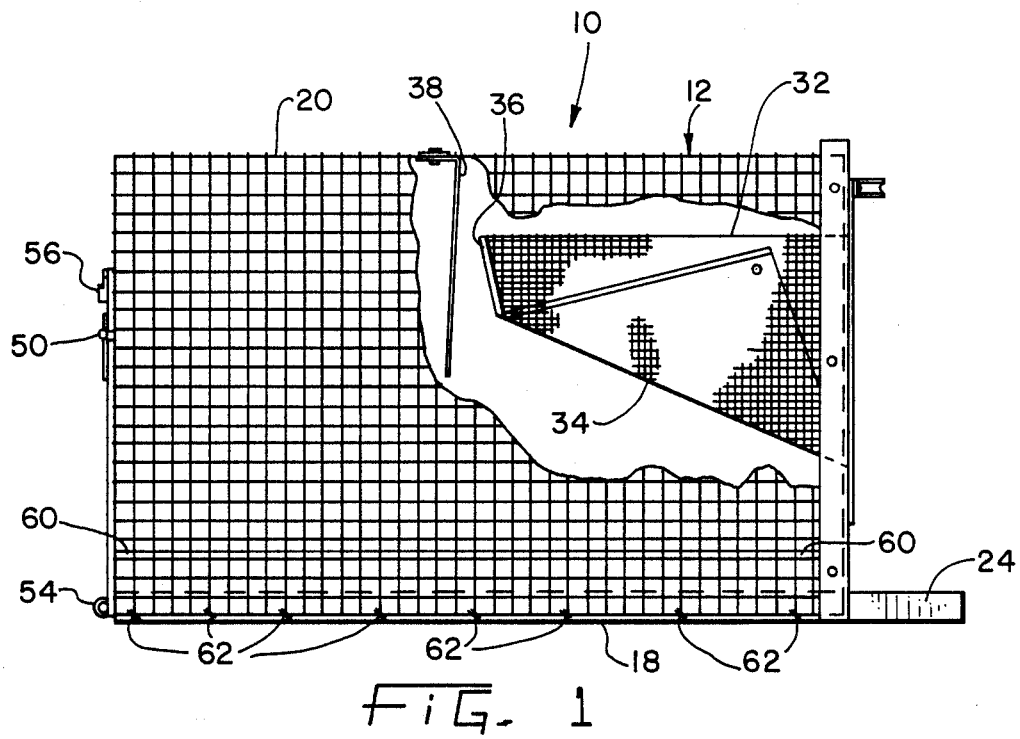
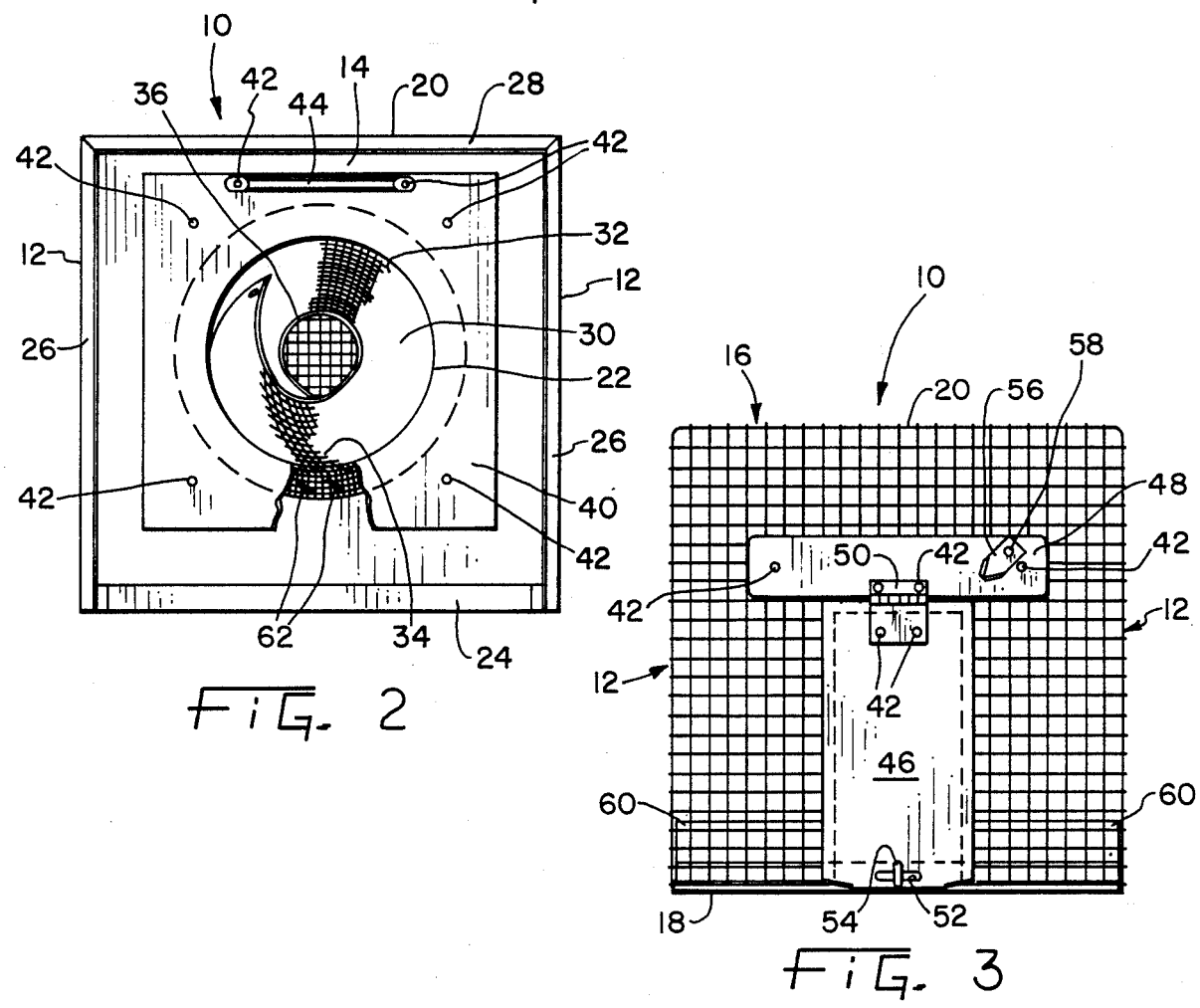

ANIMAL TRAP

BACKGROUND OF THE INVENTION

The present invention relates generally to an apparatus for trapping animals, and more particularly to an animal trap modified to trap and hold multiple animals of similar size such as chipmunks, sparrows, starlings, mice and the like without harming the animals in the trapping process.

Various types of small animals such as sparrows, starlings, crows, rodents and other mammals can be serious problems to inter alia farmers, airports and to the general public. Such animals are attracted to food provided for domestic or farm animals. The undesirable animals not only steal the food from the other animals, but they also contaminate the food by leaving their droppings and by carrying germs from one place to another.

Devices for eliminating undesirable animals from a certain environment without harming the desirable animals have been generally unsuccessful. Various chemicals have been used for eliminating certain undesirable animals. Chemical extermination is usally expensive and may have little effect against such animals. Such chemical methods of extermination through the natural food chain can create undesirable effects on the community in general. In many cases, the undesirable effects are not apparent in the community for several years.

Environmentalists have been concerned over both the spread of disease by undesirable small animals as well as by the dangerous effect of chemical methods for eliminating such animals. Sparrows appear to be one of the biggest nuisances because of their ability to tolerate polluted water. Sparrows spread germs and disease such as cholera throughout an animal population. The sparrows are also a particular nuisance in airports where they will build nests inside the wings.

Consequently a need exists for an apparatus which will trap animals without harming or injuring them, but which will readily permit humane extermination of the undesirable animals within the trap. There does not appear to be an apparatus currently available which provides for the restraining of multiple animals of similar size without polluting the area, and which permits both humane extermination or elimination of the undesirable animals and protection of the desirable animals so they can be readmitted into the environment.

SUMMARY OF THE INVENTION

The apparatus of the present invention provides an animal trap which will attract certain animals and restrain them without harm until the trap can be emptied. The collection of animals within the trap can be readily observed, and this feature appears to attract more animals. The animals lured into the trap will be determined by such factors as the size of the entrance into the trap, the location of the trap as well as the type bait within the trap.

The apparatus of the present invention, in one form thereof, provides a portable wire mesh cage with a generally flat roof and floor, and has a hinged door which can be locked both in a closed position to restrain the animals within the cage, and in an open position to facilitate cleaning the cage. By locking the door in the open position, only one hand is needed to clear the cage. The flat roof facilitates shielding the animals to protect them from excessive sun or rain while allowing the walls to remain "open" for better ventilation and visibility to attract more animals. A generally round opening in a solid wall provides an entrance to the trap. The floor is solid and extends beyond the solid entrance wall to provide a ledge under the entrance.

One end of a generally conical tunnel is secured to the solid wall around the entrance. Food placed on the ledge and in the tunnel will lure the animals into the trap. The tunnel has a reduced end within the cage intermediate the roof and the floor. The roof of the tunnel is substantially parallel with the roof of the cage. The floor of the tunnel inclines generally upward from the entrance to the reduced end. As a result of such arrangement, the roof of the tunnel extends beyond the floor of the tunnel at the reduced end, to give the effect of a longer tunnel. Thus, when the animal reaches the reduced end, it will drop to the floor of the cage. A flap is suspended from the roof of the cage in close proximity to the reduced end of the tunnel. The bottom of the flap is disposed intermediate the bottom of the reduced end and the floor. The flap provides a baffle to prevent entry into the tunnel from the reduced end.

The tunnel and the flap are preferably a finer mesh than the walls and roof of the cage. The finer mesh of the tunnel retains bait placed along its floor. The close proximity of the flap to the reduced end gives the appearance of a wall at the reduced end of the tunnel. This appears to give the animal confidence to follow the food trail into the end of the tunnel. The animal's feet will not stabilize on the fine mesh of the flap and this prevents them from escaping by gripping the flap to exit the trap through the reduced end of the tunnel.

In addition to the solid floor and wall for the entrance to the trap, a solid band approximately two inches high extends around the base of the mesh walls of the trap. Such solid floor and solid wall base portion retains the feed within the cage so that animals outside the trap do not have access to feed around the trap. The solid floor also to keeps the animals' droppings off the ground to prevent pollution of the area. The generally flat floor permits the trap to be set on a variety of surfaces where the animal population needs to be eliminated or discouraged. Placing a particular food on the ledge and along the tunnel floor encourages the animals to enter the trap through the tunnel. As the animal follows the feed through the tunnel, the floor of the tunnel suddenly disappears and the animal drops to the bottom of the cage.

The hinged door is preferably solid for ease in opening the door for clearing the cage. A mesh door would permit the animals to hang on the door as they tried to climb around the cage. A handle mounted on the solid wall intermediate the roof and the entrance to the tunnel provides for ease of portability of the cage.

Accordingly, the present invention relates to an apparatus for humanely trapping animals within a certain size range and restraining them until they can be properly and humanely eliminated from or freed back into the environment.

It is an object of the invention to provide a humane trap for restraining animals of a similar size.

It is another object of the invention to provide an animal trap which will also protect the environment from pollution by a large population of animals in one area.

It is a further object of this invention to provide a portable animal trap which can be easily maintained and reused.

It is yet a further object of this invention to provide an animal trap which will permit segregation of the undesirable animals yet permit the release of the desirable animals.

Additional objects and advantages of this invention will become apparent from the following detailed description.

BRIEF DESCRIPTION OF THE DRAWINGS

The above-mentioned and other features and objects of this invention, the manner of attaining them, and the invention itself will be better understood by reference to the following description of an embodiment taken in conjunction with the accompanying drawings. Like reference characters refer to the same or similar parts throughout the views:

FIG. 1 is a side elevation of one embodiment of the apparatus partially cut away;

FIG. 2 is a front elevation of one embodiment of the apparatus partially cut away; and FIG. 3 is a rear elevation of one embodiment of the apparatus.

DESCRIPTION OF A PREFERRED EMBODIMENT

Referring now to the drawings, there is shown the apparatus for trapping animals generally designated 10. The apparatus 10 includes side walls 12, a front wall 14, a rear wall 16, a floor member 18 and a roof member 20. The side walls 12, rear wall 16 and roof member 20 are preferably a wire mesh material of suitable size to restrain animals within the cage.

The front wall 14 is preferably composed of a suitable solid material such as wood, masonite and the like, and has a generally round entrance 22 disposed therein. The floor member 18 is preferably any suitable solid material such as wood, masonite, and the like. The floor member 18 extends outwardly beyond the front wall 14 to form a front ledge member 24. The wire mesh of the side walls 12 and the roof member 20 are secured to front walls 14 by side wall facing strips 26 and roof facing strip 28. Facing strips 26 and 28 can be any solid material such as wood, masonite and the like.

The entrance 22 in front wall 14 leads to a generally conical tunnel member 30, preferably of a suitable material such as a fine wire mesh, having one end secured to the entrance 22, a top portion 32, a bottom portion 34 and a reduced end 36. The tunnel member 30 extends into the apparatus 10 from the entrance 22 to the reduced end 36. The top portion 32 is disposed in a plane substantially parallel to the roof member 20. The bottom portion 34 inclines generally upward from the entrance 22 to the reduced end 36. The top portion 32 of reduced end 36 extends beyond the bottom portion 34 of reduced end 36.

A flap member 38 is secured to roof member 20 by any suitable securing means such as a brad clip, and the like, adjacent the reduced end 36. The bottom end of flap member 36 is disposed intermediate the roof member 20 and the floor member 18. Flap member 38 is preferably of the same fine mesh material as is used for tunnel member 30.

The tunnel member 30 is secured to entrance 22 both by nails, staples and the like and by a front wall facing 40. The front wall facing 40 can be secured to front wall 14 by any suitable means such as nails, screws and the like 42. A handle member 44 is attached to front wall 14 by any suitable means such as nails, screws and the like 42. The handle member 44 is of any suitable material such as rope, leather, metal and the like.

The rear wall 16 includes a door member 46 of any suitable solid material such as aluminum, vinyl and the like. A solid strip member 48 is mounted on the rear wall 16 above the door member 46. A hinge member 50 is secured to the strip member 48 and to the door member 46 by any suitable means such as nails, screws and the like 42.

The door member 46 has a slot 52 in the bottom portion thereof. The slot 52 is disposed to receive a locking pin member 54. The locking pin member 54 can be any suitable device such as an "eye-screw" which is mounted in floor member 18. A second lock member 56 is mounted on strip member 48. When the door member 46 is opened for servicing the interior of the apparatus 10, the second lock member 56 holds the door member 46 in an open position. The second lock member 56 can be attached to strip member 48 by any suitable attaching means such as a pop rivet 58.

The side walls 12 and the rear wall 16 have a lower band 60 of a substantially solid material such as aluminum siding, vinyl and the like. The lower band 60 extends from rear wall 16 to front wall 14 along each of side walls 12, and along rear wall 16 from side walls 12 to the door member 46. The lower band 60 as well as the solid floor member 18 prevents the loss of food from the apparatus 10. The solid floor 18 also eliminates pollution of the environment from droppings of the animals. The wire mesh of side walls 12 and rear wall 16 is secured to floor member 18 by suitable securing means such as staples 62 and the like. Securing devices such as staples 62 also can be used to secure the wire mesh of tunnel member 30 to front wall 14. The lower band 60 is placed within the apparatus 10.

While alternate embodiments of this invention have been described, it will be understood that it is capable of further modifications. This application is, therefore, intended to cover any variations, uses, or adaptations of the invention following the general principles thereof, and including such departures from the present disclosure as come within known or customary practices in the art to which this invention pertains and falls within the limits of the appended claims.

What is claimed is:

1. An apparatus for trapping animals, comprising:
   means for housing at least one animal, said means comprising a floor member, a roof member and a plurality of spaced-apart wall members, whereby one of said plurality of wall members includes means for entering said housing by said at least one animal of certain size, and another one of said plurality of wall members includes means for selectively releasing said at least one animal from said housing means;
   a generally conical tunnel member made of fine wire mesh having an upper portion, a bottom portion and opposite open ends, one of said opposite open ends being adapted to be secured to said entrance means and the other of said opposite open ends having a reduced opening, said reduced opening being disposed within said housing means intermediate said floor member and said roof member;
   baffle means made of the same fine wire mesh as the conical tunnel member mounted within said housing means adjacent said reduced open end, whereby said at least one animal within said housing means is prevented from entering said reduced end;

a ledge member adapted for being extended externally to said housing means adjacent said entrance means; and handle means mounted on said housing for carrying the apparatus.

2. The apparatus of claim 1, wherein said means for selectively releasing said at least one animal from said housing comprises a door member mounted on said one of said plurality of wall members.

3. The apparatus of claim 2, wherein said floor member, said door member and said one of said plurality of wall members having said entrance means is solid.

4. The apparatus of claim 1, wherein one of said upper portion and said bottom portion of said tunnel member extends beyond the other of said upper portion and said bottom portion at said reduced end.

5. The apparatus of claim 1, wherein said upper portion of said tunnel member extends beyond said bottom portion of said tunnel member at said reduced end.

6. The apparatus of claim 1, wherein the means for housing is made of a coarser wire mesh than the wire mesh of the tunnel member and baffle means.

7. The apparatus of claim 5, wherein said baffle means comprises a flap means mounted on said roof member adjacent said reduced end, for preventing said at least one animal from exiting said apparatus through said reduced end of said tunnel member.

8. The apparatus of claim 5, wherein said bottom portion of said tunnel member inclines generally upward intermediate said entrance means and said reduced end.

9. An apparatus for trapping animals, comprising:

a cage member for housing at least one animal, said cage member including a floor member, a roof member, a plurality of spaced-apart wall members, one of said plurality of wall members including one of a first opening and a second opening, and another one of said plurality of wall members including the other one of said first opening and said second opening, said means mounted over one of said first opening and said second opening and for selectively restraining said at least one animal in said cage member;

a generally conical tunnel member made of fine wire mesh having opposite open ends, one of said open ends being secured to one of said first opening and said second opening, and the other of said open ends having a reduced opening wherein said reduced opening is disposed intermediate opposite ones of said spaced-apart wall members and intermediate said roof member and said floor member;

baffle means made of the same fine wire mesh as the conical tunnel member mounted on said roof member adjacent said reduced opening for preventing said at least one animal from exiting said cage member through said reduced opening;

ledge means for extending outwardly from said one of said plurality of wall members adjacent one of said first openings and said second opening; and a handle means mounted on said cage member adjacent one of said first opening end and said second opening.

10. An apparatus for trapping animals, comprising:

means for housing at least one animal said housing member comprising:

a floor member, a roof member, a plurality of spaced-apart wall members, one of said plurality of wall members including one of a first opening and a second opening and another one of said plurality of said wall members including the other one of said first opening and said second opening, and a diir member pivotally mounted over one of said first opening and said second opening whereby said door member can be selectively secured in one of an open position and a closed position;

a generally conical tunnel member made of fine wire mesh having opposite open ends, one of said opposite open ends being secured to one of said first opening and said second opening and the other of said opposite open ends being disposed within said housing means, said tunnel member having a generally upwardly inclined bottom portion leading from said one of said first opening and said second opening to said opposite end, and an upper portion disposed substantially parallel to said roof member of said housing means;

a baffle member made of the same fine wire mesh as the conical tunnel member mounted on said roof member adjacent said one of opposite ends of said tunnel member within said housing means, said baffle member being adapted for preventing the escape of said at least one animal from said housing means through said tunnel member;

a ledge member adapted for extending outwardly from said floor member adjacent to said one of said first opening and said second opening; and a handle member mounted on said one of said wall members adjacent said one of said first opening and said second openings.

* * * * *